US011985965B2

(12) United States Patent
Yasuda

(10) Patent No.: US 11,985,965 B2
(45) Date of Patent: May 21, 2024

(54) FISHING INFORMATION MANAGEMENT SYSTEM

(71) Applicant: GLOBERIDE, Inc., Tokyo (JP)

(72) Inventor: Hiromu Yasuda, Tokyo (JP)

(73) Assignee: GLOBERIDE, INC., Tokyo (JP)

(*) Notice: Subject to any disclaimer, the term of this patent is extended or adjusted under 35 U.S.C. 154(b) by 34 days.

(21) Appl. No.: 17/186,632

(22) Filed: Feb. 26, 2021

(65) Prior Publication Data
US 2022/0061297 A1 Mar. 3, 2022

(30) Foreign Application Priority Data

Aug. 27, 2020 (JP) ................................. 2020-143240

(51) Int. Cl.
A01K 99/00 (2006.01)
A01K 97/00 (2006.01)
A01K 97/12 (2006.01)
A63F 13/798 (2014.01)
A63F 13/818 (2014.01)

(52) U.S. Cl.
CPC ............. *A01K 99/00* (2013.01); *A01K 97/00* (2013.01); *A01K 97/125* (2013.01); *A63F 13/798* (2014.09); *A63F 13/818* (2014.09)

(58) Field of Classification Search
CPC ...... A01K 97/125; A01K 97/12; A01K 97/00; A01K 99/00; A63F 13/798; A63F 13/818
USPC .................................................. 43/4.5, 4, 17
See application file for complete search history.

(56) References Cited

U.S. PATENT DOCUMENTS

| 4,634,072 A | * | 1/1987 | Stealy | A01K 97/20 250/559.07 |
| 4,693,125 A | * | 9/1987 | Krutz | A01K 87/00 43/17 |
| 4,697,758 A | * | 10/1987 | Hirose | A01K 89/015 242/223 |
| 5,259,252 A | * | 11/1993 | Kruse | A01K 97/00 177/148 |

(Continued)

FOREIGN PATENT DOCUMENTS

JP 2002-262736 A 9/2002
JP 2006-042607 2/2006

(Continued)

OTHER PUBLICATIONS

Extended European Search Report for related European Application No. 21160238.8; report dated Jul. 27, 2021; (8 pages).

(Continued)

*Primary Examiner* — Darren W Ark
*Assistant Examiner* — Zoe Tam Tran
(74) *Attorney, Agent, or Firm* — Oliff PLC

(57) ABSTRACT

A fishing information management system has a fishing rod to which a fishing reel with a spool capable of winding a fishing line is attached, and is configured to include an operation/environment information detector that detects information on operation and environment of operation of fishing tools when in use including the fishing reel and the fishing rod, a calculator that calculates the skill levels in operating the fishing tools from information on the operation of the fishing tools, a storage that stores the detection values and the skill levels, and an indicator that displays at least either of the detection values or the skill levels.

7 Claims, 10 Drawing Sheets

(56) References Cited

U.S. PATENT DOCUMENTS

| | | | | |
|---|---|---|---|---|
| 5,542,672 | A * | 8/1996 | Meredith | G05G 1/085 463/7 |
| 5,833,156 | A * | 11/1998 | Park | A01K 89/01555 242/223 |
| 6,312,335 | B1 * | 11/2001 | Tosaki | A63F 13/245 463/37 |
| 6,361,436 | B1 * | 3/2002 | Gouji | A63F 13/537 463/31 |
| 6,412,722 | B1 * | 7/2002 | Kreuser | A01K 89/01555 242/288 |
| 6,584,722 | B1 | 7/2003 | Walls et al. | |
| 7,021,140 | B2 * | 4/2006 | Perkins | G01P 9/00 473/219 |
| 7,108,213 | B2 * | 9/2006 | Hitomi | A01K 89/00 33/732 |
| 7,712,695 | B2 * | 5/2010 | Yusa | A01K 89/01555 242/223 |
| 9,002,663 | B2 * | 4/2015 | Rayor | A01K 97/00 702/42 |
| 11,229,194 | B2 * | 1/2022 | Perkins | A01K 87/007 |
| 11,413,526 | B2 * | 8/2022 | Blackadar | A63F 13/65 |
| 2008/0016749 | A1 * | 1/2008 | Priednieks | A01K 91/20 340/573.2 |
| 2011/0259988 | A1 * | 10/2011 | Strohecker | A01K 89/0183 700/275 |
| 2014/0109461 | A1 * | 4/2014 | Ash | A01K 91/02 43/4.5 |
| 2014/0358483 | A1 * | 12/2014 | da Rosa | G01D 9/28 702/188 |
| 2015/0033611 | A1 * | 2/2015 | Hamilton | A01K 85/01 43/17 |
| 2015/0119120 | A1 * | 4/2015 | Spagnola | A63F 13/798 463/1 |
| 2016/0030850 | A1 * | 2/2016 | Sophos | A63F 13/30 463/2 |
| 2016/0353725 | A1 * | 12/2016 | Worley, III | A01K 87/007 |
| 2017/0225079 | A1 * | 8/2017 | Conti | A63F 13/35 |
| 2018/0295826 | A1 * | 10/2018 | Blackadar | A01K 97/00 |
| 2020/0137995 | A1 | 5/2020 | Ikebukuro | |
| 2021/0298284 | A1 * | 9/2021 | Yasuda | A01K 89/0155 |
| 2022/0061292 | A1 * | 3/2022 | Yasuda | A01K 89/015 |

FOREIGN PATENT DOCUMENTS

| | | |
|---|---|---|
| JP | 2019004774 A | 1/2019 |
| JP | 2019187283 A | 10/2019 |
| JP | 2020068736 A | 5/2020 |
| KR | 10-2017-0079135 A | 7/2017 |
| KR | 20190062289 A | 6/2019 |
| KR | 20200050347 A | 5/2020 |
| KR | 102137064 B1 | 7/2020 |
| WO | 2017112778 A1 | 6/2017 |

OTHER PUBLICATIONS

Chinese Office Action for related Chinese Application No. 202110246816.2; action dated Sep. 29, 2022; (17 pages).

Office Action for related Korean Patent Application No. 10-2021-0020850; action mailed on Jan. 19, 2023; (8 pages).

Korean Rejection Decision in connection with Korean Patent Application No. 10-2021-0020850; action mailed on Jul. 6, 2023; (8 pages).

Office Action in connection with Japanese Patent Application No. 2020-143240; action dated May 30, 2023; (8 pages).

Office Action in connection with related Chinese Patent Application No. 202110246816.2; action dated Apr. 12, 2023; (17 pages).

Jan. 24, 2024 Office Action issued in Korean Patent Application No. 10-2021-0020850.

Jan. 24, 2024 Decision on Dismissal of Amendment issued in Korean Patent Application No. 10-2021-0020850.

Feb. 19, 2024 Examination Report issued in European Patent Application No. 21160238.8.

* cited by examiner

Fishing Competition Results on dd/mm

| Ranking | Name | No. of Fishes | Fishing Skill |
|---|---|---|---|
| 1 | Yamada | 12 | 53 |
| 2 | Tanaka | 7 | 34 |
| 3 | Sato | 7 | 29 |
| 4 | Suzuki | 4 | 20 |

Fishing Skill Report as of dd/mm

★ ★ ★ You Broke Your Flying Distance Record.  64m ★ ★ ★

Your casting level has increased from 23 to 30.

Reeling Skill: 23

Fighting Skill: No evaluation

Number of castings today:    108

Total casting distance today:    3280m

Number of hours of use today: 7:32:15

FIG. 10

FISHING INFORMATION MANAGEMENT SYSTEM

TECHNICAL FIELD

This disclosure relates to a fishing information management system including a fishing rod to which a fishing reel with a spool capable of winding a fishing line is attached.

BACKGROUND

Generally, when fishing for deep-field fish such as in boat fishing, an electric fishing reel ("fishing reel") has been widely used.

Conventionally, that type of fishing reel is provided with a line-length measuring device that measures the length of a wound or unwound fishing line based on the rotation speed of a spool to improve the catch by accurately adjusting the fishing depth, and the values measured by the line-length measuring device appear on an indicator provided on the reel body.

As such a fishing reel, Japanese Patent Application Publication No. 2006-42607 discloses a fishing reel including a spool rotatably supported by the side plates of the reel body therebetween, a winding speed detection means that detects the winding speed during the winding operation of a fishing line wound on the spool, and an indicator that displays the values detected by the winding speed detection means.

However, in the fishing reel disclosed in Japanese Patent Application Publication No. 2006-42607, detection values of winding speed are displayed on an indicator provided on the reel body, but are not intended to be transmitted outside of the reel. Further, even if the fishing reel information can be displayed, the fishing reel disclosed in Japanese Patent Application Publication No. 2006-42607 only displays specific information of the reel even though there are a variety of fishing information such as a lure, fishing images and the fishing environment. There has been, therefore, a problem that the information is extremely limited compared to information generally desired by fishermen. On the other hand, there has been also a problem that providing a variety of fishing information alone is not enough to further improve fishermen's satisfaction with fishing.

It could therefore be helpful to provide a fishing information management system including a fishing rod at which a fishing reel with a spool capable of winding a fishing line is attached, and that can calculate a level of fishing skill from a variety of fishing information.

SUMMARY

I thus provide:

A fishing information management system has a fishing rod to which a fishing reel with a spool capable of winding a fishing line is attached, and is configured to include an operation/environment information detector (operation/environment information detecting unit or operation/environment information detecting portion) that detects information on operation and operation environment of the fishing tools when in use, including the fishing reel and the fishing rod, a calculator (calculating unit or calculating portion) that calculates a level of skill of operating the fishing tools from information on operation of the fishing tools, a storage (storing unit or storing portion) that stores the detection values and the level of skill, and an indicator (indicating unit or indicating portion) that displays at least either of the detection values or the level of skill.

The fishing tools may be configured to include at least the fishing reel, the fishing rod, the fishing line, a hook, and a rig.

The operation environment of the fishing tools may be configured to include at least the start time of use, the end time of use, the weather condition during use, and the place of use, of the fishing tools.

The operation/environment information detector may be configured to include at least a reel operation information detector (reel operation information detecting unit or reel operation information detecting portion) that detects operation information of the fishing reel, and a fishing rod operation information detector (fishing rod operation information detecting unit or fishing rod operation information detecting portion) that detects the operation information of the fishing rod.

The operation information of a fishing reel may be configured to include at least one of a pulled-out amount of a reel's drag, a pulling-out speed of the reel's drag, a spool rotation start point, a spool rotation end point, a spool diameter, a maximum rotation speed of a spool, a rotation speed history of the spool, a brake setting, a motion of a fishing rod, and backlash information.

The operation information of a fishing rod may be configured to include at least one of the speed, acceleration, deformation amount, motion, and casting method, of the fishing rod.

The level of skill of operating the fishing tools may be configured to be calculated from at least one of a flying distance of a reel, a maximum rotation speed of the reel, or a time required to retrieve a rig and cast out the rig again.

It is thus possible to provide a fishing information management system that includes a fishing rod to which a fishing reel with a spool capable of winding a fishing line is attached, and that can calculate a level of fishing skill from a variety of fishing information.

BRIEF DESCRIPTION OF THE DRAWINGS

FIG. 10 is a diagram illustrating an example of a skill value in a fishing information management system according to an example.

DESCRIPTION OF THE NUMERICAL REFERENCES

Figure 1:
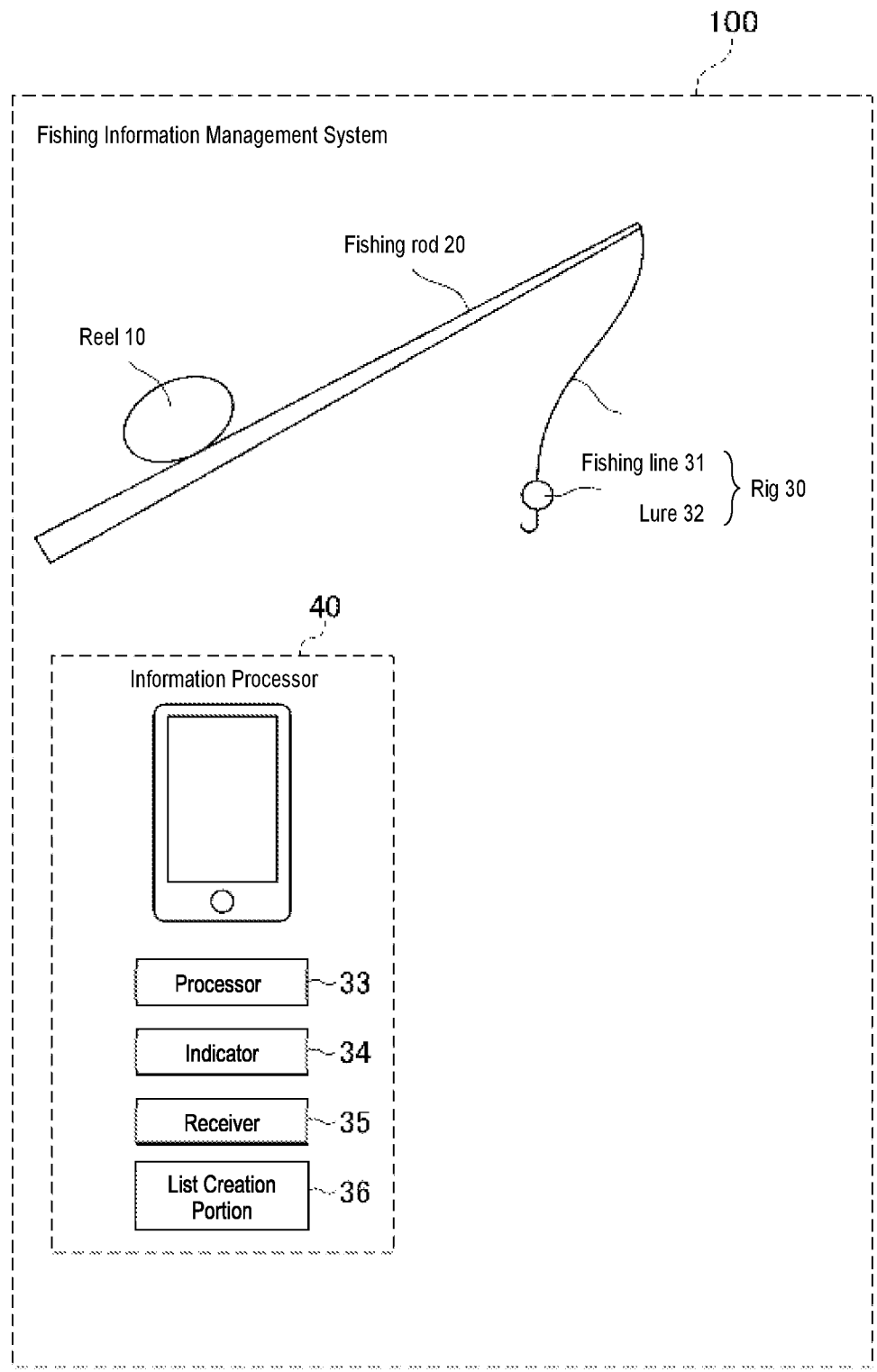
FIG. 1 is a diagram illustrating a fishing information management system according to an example.

10 Fishing reel
11 Spool
12 Clutch
13 Drag device
14 Operation portion
15 Braking device
16 Calculator
17 Communication portion
18 Storage
19 Detector
20 Fishing rod
21 Detector
22 Operation/environment information detector
23 Reel operation information detector
24 Fishing rod operation information detector
25 Transmitter (transmitter/receiver)
30 Rig
31 Fishing line
32 Lure (artificial bait)
33 Processor
34 Indicator
35 Receiver
36 List creation portion
40 Information processor
100 Fishing information management system

DETAILED DESCRIPTION

Hereinafter, examples of my systems and methods will be described in detail with reference to the accompanying drawings. Components common in the plurality of drawings are denoted by the same reference numerals through the plurality of drawings. Each of the drawings is not necessarily scaled for convenience of explanation.

A catch in fishing is affected by factors both related and unrelated to a user himself/herself, that is, not only fishing skills, but also weather conditions and appetite of fish. Many fishermen aim to improve their skills to increase their catch, but it may be inappropriate to use the number of fish caught as an indicator of the fisherman's skills for the reasons described above.

In my system, an operation applied to a fishing rod or a fishing reel is detected and calculated, thereby making it possible to index the skills of a fisherman. The fisherman's skills can be subdivided into various items such as how to select fishing tools and a fishing spot. This disclosure, however, covers fishing tool handling skills. The fishing tool handling skills can be further embodied and subdivided. The fishing tool handling skills are classified as follows:

(a) Casting skill: A skill required for casting out a rig
(b) Reeling skill: A skill required to hook a fish after casting out a rig
(c) Fighting skill: A skill required to collect a hooked fish Hereinafter, specific methods of calculating the above will be described.

First, a basic configuration of a fishing information management system 100 will be described with reference to FIGS. 1 to 4. FIG. 1 shows a configuration of the fishing information management system 100 according to an example. As illustrated, the fishing information management system 100 according to an example includes a fishing reel 10, a fishing rod 20, a rig 30 and an information processor 40.

Like general fishing reels, the fishing reel 10 can be operated in the following manner.

A threshold of tension, which is a set value, is set by winding a fishing line 31 on a spool 11, switching between the states in which the fishing line 31 can be, and cannot be, reeled out from the spool 11, and idling the spool 11 applying a tension equal to or greater than a set value to the fishing line 31 (drag function). In a double-bearing reel, braking force to prevent backlash upon casting is adjusted.

Further, the fishing reel 10 detects, and transmits to an information processor 40, part or all of the above operations and states. The details will be described later. Like general fishing rods, the fishing rod 20 has the fishing reel 10, and guides the fishing line 31. A user can manipulate the fishing line 31 as necessary by operating the fishing rod 20. The fishing rod 20 detects, and transmits to the information processor 40, part or all of the operations and states of the fishing rod 20. The details will be described later.

The rig 30 is attached to one end of a fishing line 31, and has a hook to be bitten by a fish. In this example, a hook is attached within a lure (artificial bait) 32. Further, various types of rigs are used depending on the target fish or fishing method, and a float, a weight, a ground bait container, a balance and the like are used as necessary. In an example, an operation detection means such as an acceleration sensor is provided in part of the rig, transmits operation of the lure 32 to the information processor 40. The operation detection means is waterproofed and sealed in part of the rig together with a power source, storage means and communication means. The reel 10, the fishing rod 20 and the rig 30 are hereinafter collectively called the "tackle".

The information processor 40 accumulates detection results from the respective components constituting the tackle through a receiver (receiving unit or receiving portion) 35, and creates an operation information list aggregating operation information upon each start of unwinding a fishing line, using a list creation portion (list creation unit) 36. The information processor 40 may be, for example, a portable information terminal (smart phone). Further, a fishing information processor 10 may be incorporated in a fishing reel 1 or the fishing rod 20 to constitute part thereof. Alternatively, part of the fishing information processor 10 may be incorporated in the fishing reel 1 or the fishing rod 20. Part or all of the information processor 40 may also be located in a server (cloud) on the Internet.

Figure 2A:
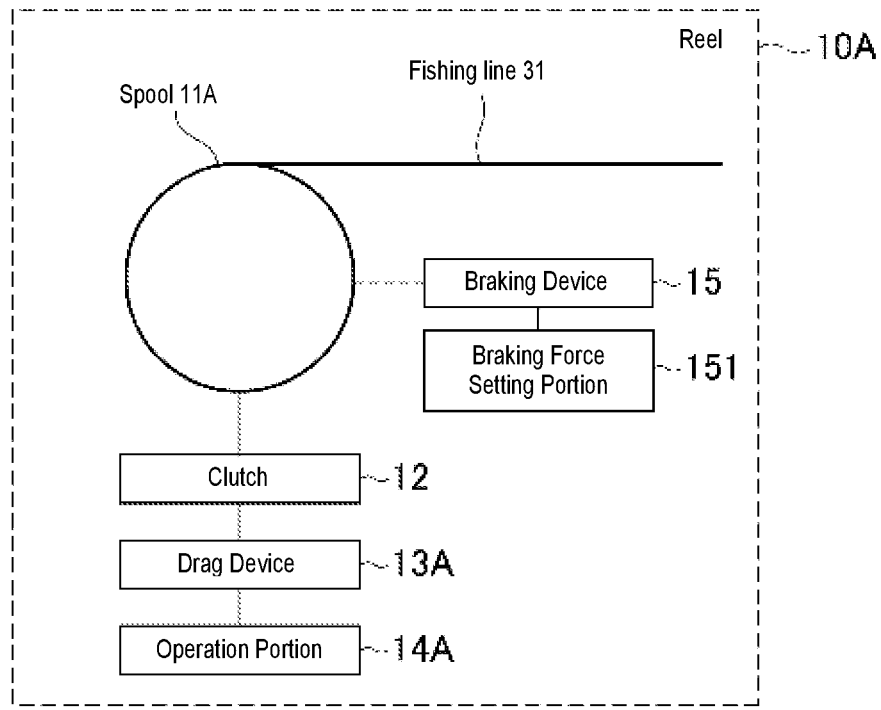
FIGS. 2(a) and (b) are diagrams illustrating a fishing information management system according to an example.
Figure 2B:
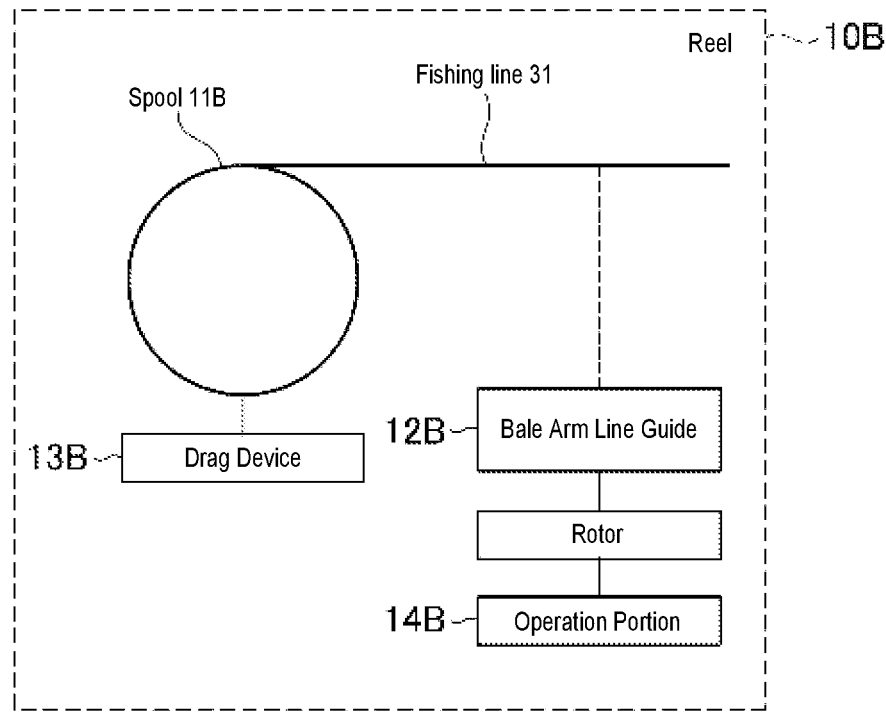

FIGS. 2(a) and 2(b) are diagrams illustrating a mechanical component configuration of the reel 10: (a) is when using a double-bearing-type reel as the reel 10; and (b) is when using a spinning-type reel. First, a double bearing reel 10A will be described. A spool 11A can wind the fishing line 31, and it is possible to wind up the fishing line 31 when the spool is rotated forward by an operation portion (operation unit) 14A.

A clutch 12 can select the connection/disconnection of the power transmission to the operating portion 14A. In the connected state, a winding can be made by the operation portion 14A, and in the disconnected state, the spool 11A can be freely rotated in the forward and backward directions so that the fishing line 31 can be reeled out. A drag device 13 can idle the spool 11 when a load equal to or greater than the tension set for the fishing line 31 is applied. The operation portion 14A is configured, for example, as a handle, and transmits the rotation operation by a user to the spool 11A via a transmission mechanism such as a gear so that the spool 11A can be rotated forward. The operation portion 14 may be a combination of an operation member such as a lever, and a power source such as a motor. A braking device 15 can also exert braking force on the spool. This suppresses the occurrence of backlash upon casting. The braking force can be set by a braking force setting portion (braking force setting unit) 151.

Next, a spinning reel 10B will be described. A spool 11B is fixed to the reel body via a drag device 13B. The drag device 13B can idle the spool 11 when a load equal to or greater than a tension set for the fishing line 31 is applied. The fishing line 31 is guided to a line guide 12B and wound on the spool 11B when the line guide 12B rotates around the spool 11. The line guide 12B is held at the end of a rotor rotatably supported with respect to the reel body, and guiding of the fishing line 31 is enabled and disabled by opening and closing a bale arm. When the bale arm is open, the fishing line 31 cannot be wound up but can be reeled out. When the bale arm is closed, the fishing line 31 can be wound up but cannot be reeled out. An operation portion 14B is configured, for example, as a handle, transmits the rotation operation by a user to a rotor via a transmission mechanism such as a gear so that the line guide 12B can be rotated forward.

Figure 3:
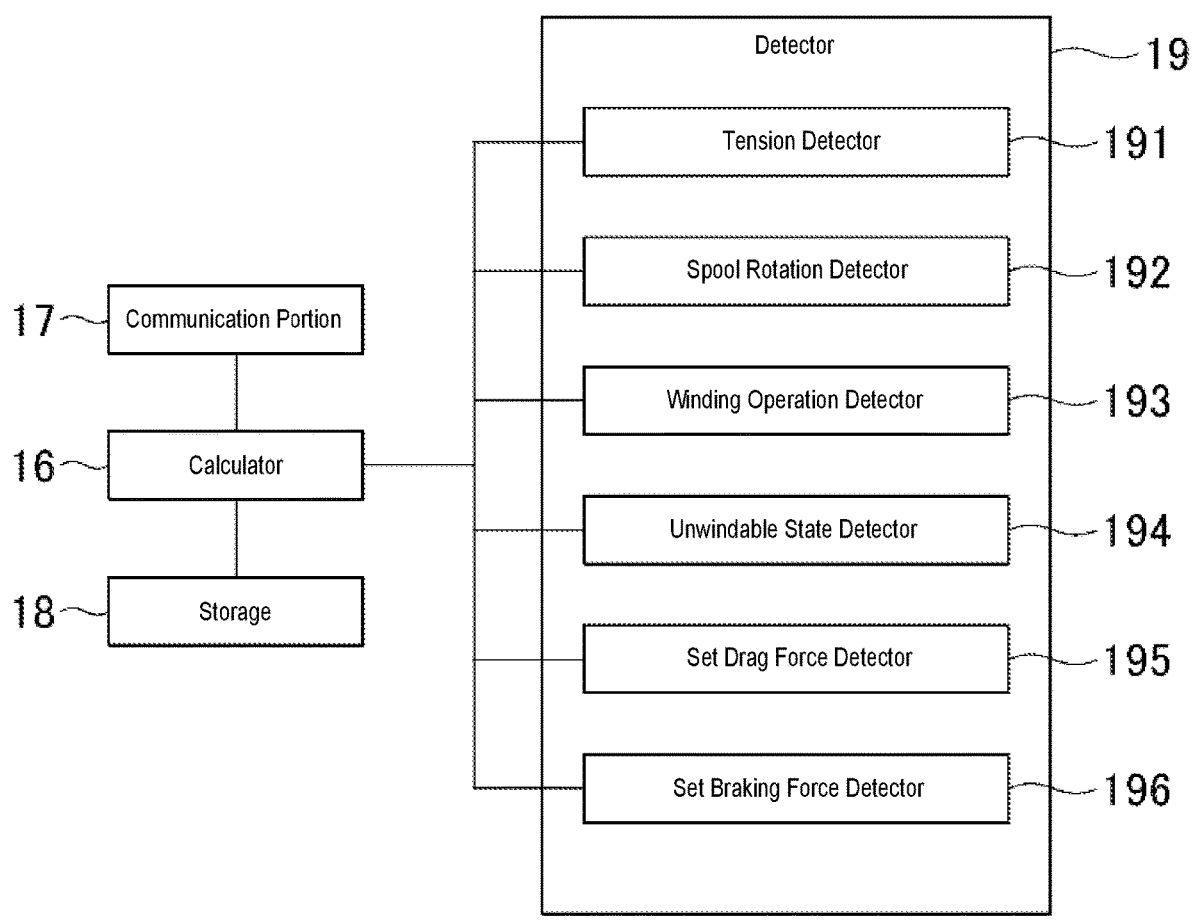
FIG. 3 is a diagram illustrating a fishing information management system according to an example.

FIG. 3 is a diagram illustrating a basic configuration of the fishing reel 10. The fishing reel 10 has a detector (detecting unit or detecting portion) 19 to detect various operations by a user and the state of the reel. The detection results are sent to a calculator (calculating unit or calculating portion) 16, and transmitted to the information processor 40 via a communication portion (communication unit) 17 after arithmetic processing or temporary storage in a storage 18 as necessary. The detector 19 includes the following. Some may be omitted due to limitations of costs, sizes and the like. A tension detector (tension detecting unit or tension detecting portion) 191 detects a tension acting on the fishing line 31. It can be realized by techniques known in the art such as detecting by a strain sensor force acting on the rotation axis of the pulley that guides the fishing line 31.

A spool rotation detector (spool rotation detecting unit or spool rotation detecting portion) 192 detects rotation of the spool 11. It can be realized by known means such as an incremental-type rotation sensor using a photo interrupter or magnetic sensor. A non-contact type rotation sensor is desirable to achieve smooth rotation of the spool 11.

A winding operation detector (winding operation detecting unit or winding operation detecting portion) 193 detects rotation of the operation portion 14. It can be realized by attaching a rotation sensor to the operation portion 14, or a gear or the like that rotates in conjunction with the operation portion 14. It can be realized by known means such as an incremental-type rotation sensor using a photo interrupter or magnetic sensor. A non-contact type rotation sensor is desirable to achieve smooth rotation of the operation portion 14. The amount of idling by the drag device 13 can be calculated by taking the difference between the winding operation detector 193 and the spool rotation detector 192.

An unwindable state detector (unwindable state detecting unit or unwindable state detecting portion) 194 detects whether or not the fishing line 31 can be unwound from the fishing reel 10. In the exemplary double-bearing reel 10A described above, it can be realized by detecting the connection status of the clutch 12. A limit sensor or the like may be attached to part of the member on which the clutch operates. In the exemplary spinning reel 10B, a limit sensor or the like may be attached to part of the member on which a bale arm operates.

A set drag force detector 195 detects a set tension that is a threshold at which the spool 11 idles. It can be realized by detecting charging force acting on a friction member in a drag device by a pressure sensor or the like. A set braking force detector (set braking force detecting unit or set braking force detecting portion) 196 detects a set value of the braking force for backlash suppression. It can be realized by providing a volume resistance or the like to the braking force setting portion 151. In a type of braking device that sets braking force by computer, the set braking force detector 196 can by realized by obtaining a command value to the braking device.

The state and the operation information of the reel 10 can be obtained or calculated by calculating with the calculator 16 the value obtained by the detector 19 as necessary. More specifically, tension acting on the fishing line, winding amount of the fishing line, pulled-out amount of the drag device, set drag force, unwindable state, and set value of braking force can be obtained. Further, the winding speed and the amount of tension change, which are the time derivative values of the foregoing, can also be calculated.

Figure 4:
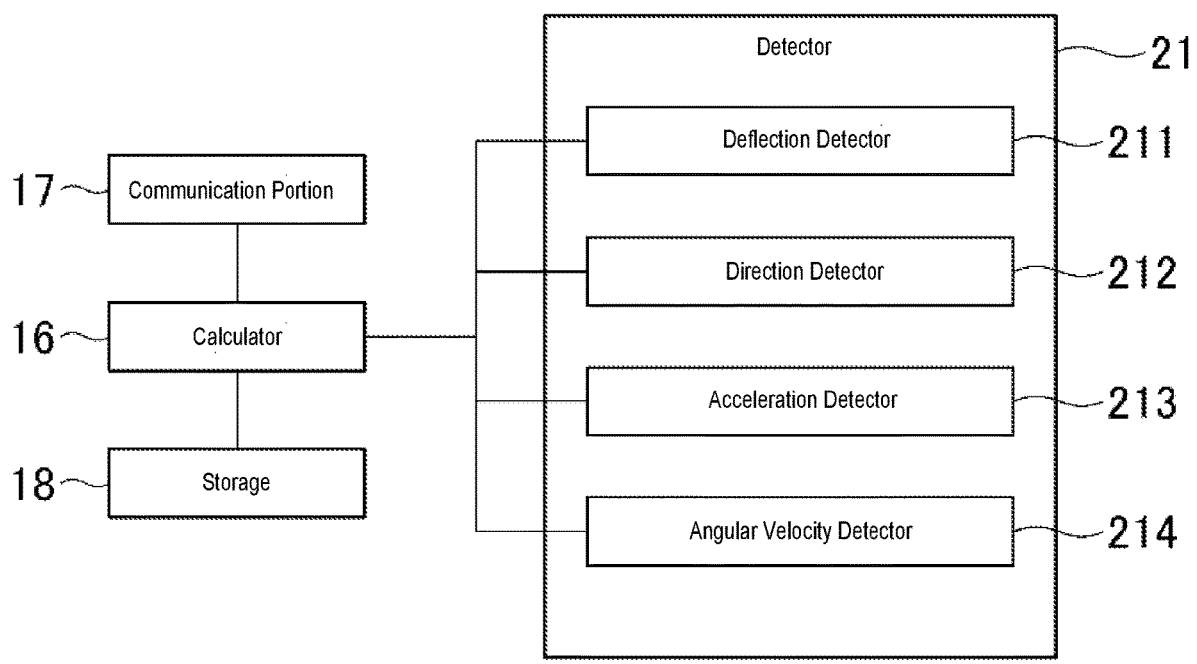
FIG. 4 is a diagram illustrating a fishing information management system according to an example.

Next, the components of the electric parts of the fishing rod 20 will be described in detail with reference to FIG. 4. The fishing rod 20 has a detector 21 that detects various operations by a user and the state of the fishing rod 20. The detection results are sent to the calculator 16, and transmitted to the information processor 40 via the communication portion 17 after arithmetic processing or temporary storage in the storage 18 as necessary. The calculator 16, the communication portion 17, and the storage 18 at this time may be shared with those of the fishing reel 10 by using a wired connection or the like, or may be dedicated to the fishing rod 20, or may be disposed within the fishing reel 10 or on the fishing rod 20.

The detector 21 includes the following. Some may be omitted due to limitations of costs, sizes and the like. A deflection detector (deflection detecting unit or deflection detecting portion) 211 detects deflection (bend) of the fishing rod 20. It can be realized by providing a strain sensor at various portions of the fishing rod 20. The direction detector (direction detecting unit or direction detecting portion) 212 can detect the direction in which the fishing rod 20 is oriented by detecting the geomagnetic direction. The acceleration detector (acceleration detecting unit or acceleration detecting portion) 213 detects the acceleration in the translation direction of the fishing rod 20. It can be realized using an acceleration sensor known in the art, such as a piezoresistive method and a capacitance detection method.

Further, an angular velocity detector (angular velocity detecting unit or angular velocity detecting portion) 214 detects the angular velocity of the fishing rod 20 (speed in the rotation direction). It can be realized using a gyro sensor known in the art such as a method of detecting a frequency change of the vibrated piezoelectric element. A sensor called a nine-axis motion sensor that detects the direction, acceleration and angular velocity of each of orthogonal three axes can be used as the direction detector 212, the acceleration detector 213, and the angular velocity detector 214. Hereafter, they are referred to as motion sensors. The attitude and the operation of the fishing rod 20 can be obtained by calculating the detection results described above. The motion sensor may be disposed in the reel 10.

Next, a method of calculating the skill of handling fishing tools will be described. First, a casting skill will be described. A user with a high casting skill can realize the following when casting out a rig:

(a) The flying distance of a rig in a cast is long.

(b) Backlash is less likely to occur.

(c) The time required to retrieve a rig and cast out the rig again is short.

Therefore, it is evaluated that the longer the measured casting distance (flying distance) of a rig is, the higher the casting skill is, that the lower the detected occurrence of line entanglement is, the higher the casting skill is, and further, that the shorter the measured time required to retrieve a rig and cast out the rig again is, the higher the casting skill is. The casting skill may be calculated using part of the elements, or a weighted average calculated using weights determined according to the reliability of the elements.

Next, a method of measuring a flying distance will be described with reference to when the double-bearing fishing reel 10A is used. A user performs the following when casting out a rig:

(1) Operating the clutch 12 to enable the fishing line 31 to be unwound (2) Casting out a rig swinging a rod to unwind the fishing line 31

(3) Enabling the fishing line 31 to be wound (not-unwindable) by the operation reverse to (1) when the rig reaches a predetermined spot (4) Waiting for a fish bite by means appropriate to fish species and fishing method by, for instance, operating an operating means 14 to let the lure swim or remain as it is (5) Operating the operation means 14 to wind the fishing line 31, and retrieving the rig when a fish is caught or a predetermined time has elapsed (6) Collecting the fish caught, or replacing the bait and the lure as necessary when completing the winding-up, and starting the operation in (1) again.

Therefore, when the unwindable state detector 194 detects that the clutch is open, the fishing line is judged to be ready to be unwound, and the count value of the spool rotation is reset. Thereafter, when a spool rotation detector (spool rotation detecting unit or spool rotation detecting portion) detects that the spool rotates backward, the count value of the spool rotation is increased according to the detected rotation amount.

When rotation of the spool stops, unwinding of the fishing line is judged to be completed. A flying distance can be calculated from the count value of the spool rotation at this time. The unwound length of the fishing line is uniquely determined by the amount of rotation of the spool if the elongation or slack of the fishing line is negligible and therefore, can be calculated by a known conversion formula. Though the horizontal flying distance of the rig and the unwound length of the line may differ depending on the trajectory of the rig, no significant difference is seen in ordinary casting. Therefore, the unwound length of the line can be regarded as the flying distance of the rig.

If the flying distance of the rig obtained in this way is equal to or greater than a predetermined value, the casting skill is rated high. Even highly skilled user often casts a rig at a short distance according to the situation of a fishing spot. It is therefore often inappropriate to rate the casting skill low even if the minimum or average flying distance is short.

Further, the higher the maximum rotation speed of the spool is upon casting, and the faster the angular velocity of the fishing rod is, the farther a rig can be cast out. Therefore, the casting skill may be rated high when these values are equal to or greater than predetermined values.

The level of difficulty of casting out a rig varies depending on weather conditions and types of tackle, and the flying distance tends to increase under the following conditions, for example:

(a) A fishing rod is long.

(b) A weight is heavy.

(c) A fishing line is fine.

(d) The air resistance of a rig is small.

(e) The tailwind is strong.

Therefore, it is even better to input information on a rig and a fishing rod used for the tackle, weather conditions and the like to the information processor 40, and evaluate the casting skill by correcting the influence thereof. For example, when a short fishing rod is used to cast a distance of 50 m, a higher rating can be given than when a long fishing rod is used to cast the same distance.

Next, a method of detecting the occurrence of line entanglement will be described. If a spool rotates faster than the unwinding speed of the fishing line when casting using the double-bearing fishing reel 10A, a portion of the fishing line is not reeled out and stays in the reel, resulting in entanglement, which is called backlash.

In the event of the occurrence of line entanglement, if the line is badly entangled, the entangled line hinders the normal rotation of the spool, which makes it impossible to perform a winding operation. Even when the line is not so badly entangled, it is desirable to eliminate the slack of the line to avoid any trouble that may arise thereafter. Therefore, a user needs to disentangle the line before performing the winding operation. The user needs to follow the following steps to disentangle the line:

(a) Enabling the line to be reeled out by switching off the clutch or relaxing the set drag force of the drag device (b) Pulling out the slacked portion of the line (c) Disentangling the portion of the line that cannot be pulled out (d) Pulling out the line until the slack disappears after disentangling the line (e) Winding the line on the spool after eliminating the slack (f) Starting fishing again after all the line that was pulled out are wound up and there is no slack and entanglement of the line.

Figure 5A:
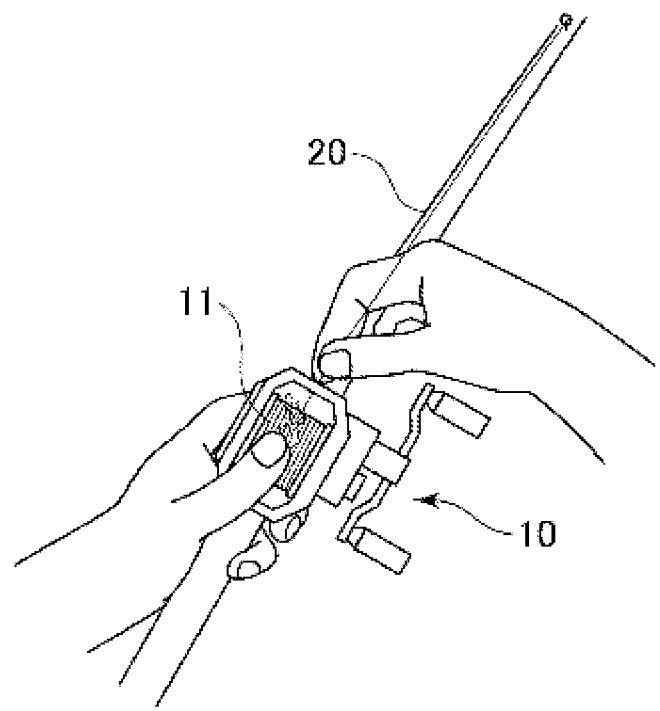
FIGS. 5 (a) and (b) are diagrams illustrating an example of how to disentangle a line in a fishing information management system according to an example.
Figure 5B:
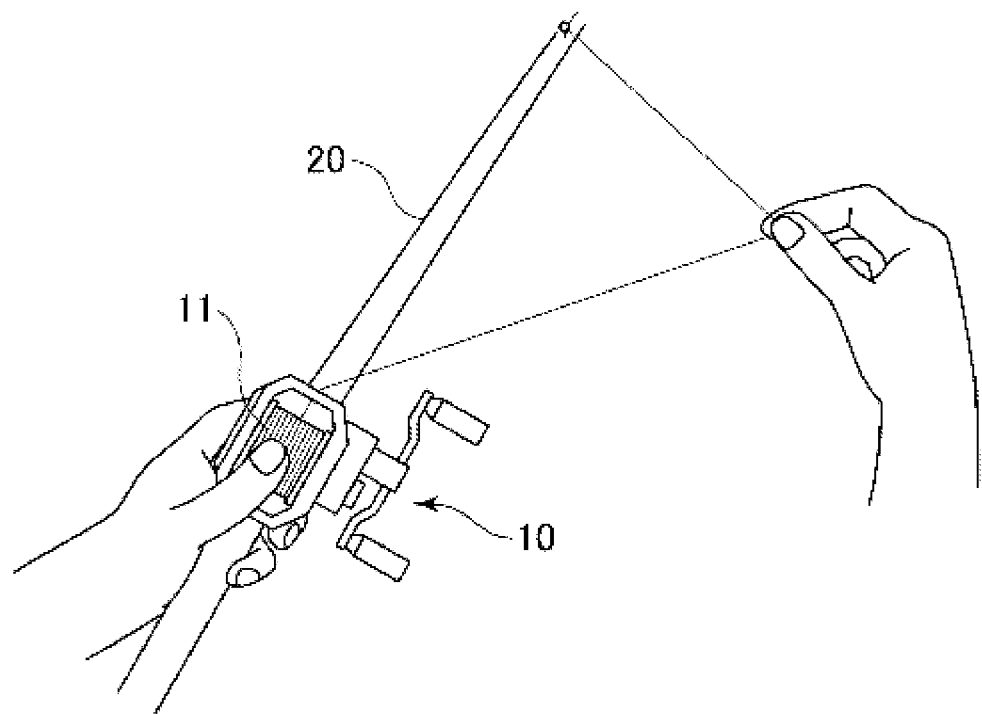

In the event of performing the above operations, the user repeats the operation of pinching the slack line and pulling out the same by stretching his/her arm as shown in FIGS. 5(a) and 5(b). The line wound on the spool is pulled out intermittently a plurality of times by approximately several tens of centimeters to 1 m. This operation is required many times when the line is badly entangled, but it is done soon otherwise.

Next, a method of detecting line entanglement will be described in more detail. Among the methods of using fishing reels, pulling out the line as described above is specific to the operation of fixing the backlash. Therefore, detecting this operation and measuring the duration thereof make it possible to assume the occurrence of backlash and the severity of the line entanglement.

Figures 5B, 6:
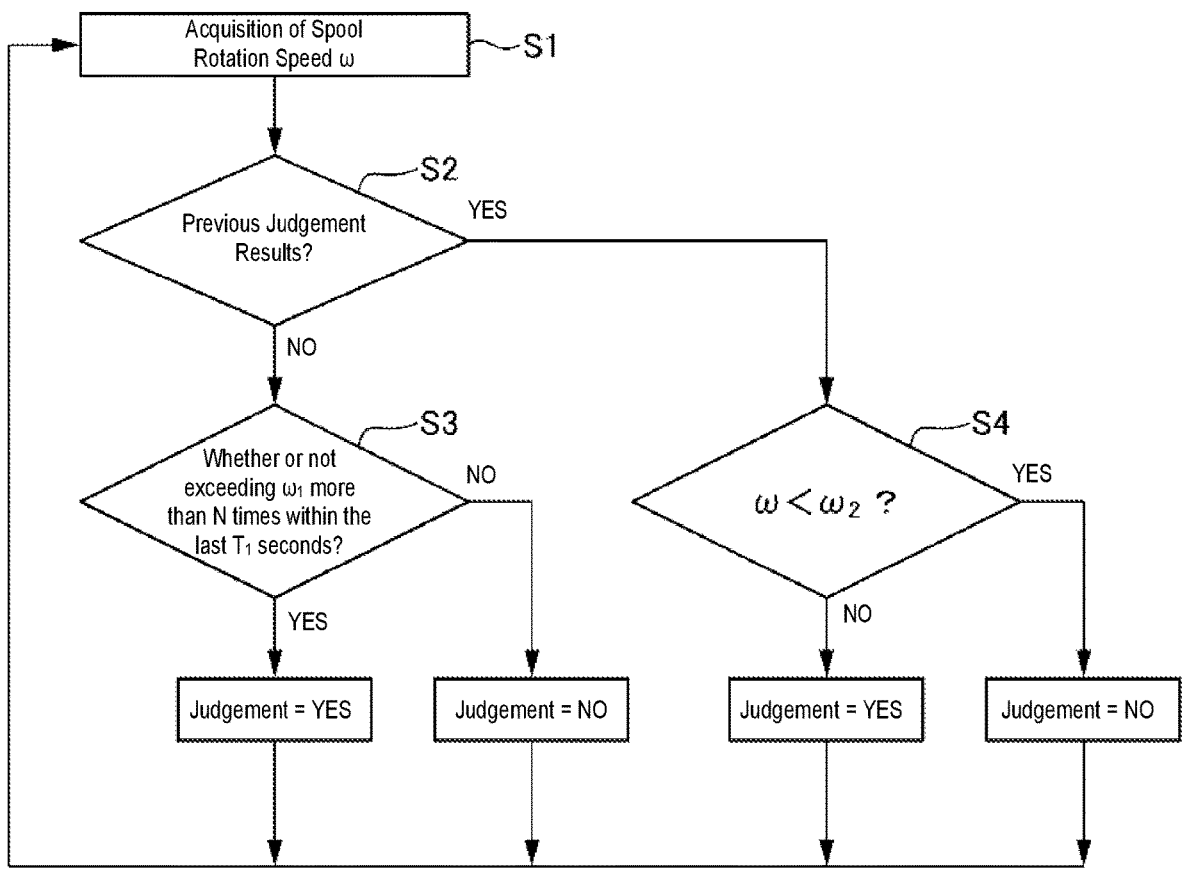
FIG. 6 is a diagram illustrating a method of detecting backlash in a fishing information management system according to an example.

This specific calculation method will be described with reference to the flowchart in FIG. 6. When detecting completion of casting, the program starts. The completion of casting can be detected, for example, when the clutch is switched from off to on, or when the spool rotating at a high speed stops, or becomes a predetermined value or less.

After the program starts, the spool rotation speed is constantly monitored in (S1). Next, in (S2), the subsequent process is changed according to the result of the last judgement made on the backlash. Since the absence of backlash is set as a default value, the process moves from (S2) on to (S3) when it is executed first time.

In (S3), the number of times when a spool rotation speed ω exceeds the rising threshold which is the rotation speed ωl (predetermined rotation speed) within the past T1 seconds is counted. That is, when ωl is 20, it is counted in the number of times when ω changes from 0 to 30, but not when ωl remains to be 20 or more.

When the count value is N or more, it is deemed that the backlash is now being fixed. It is possible to distinguish between the steps (B) and (C) referred to above by appropriately setting the values of N and T1. The larger N is, the more misjudgment of tug of fish as backlash can be avoided. However, time T1 required to judge the occurrence of backlash increases. In this example, N and T1 are set to 2 and 3 seconds, respectively. Further, the value of ωl may be set to a rotation speed equal to or less than the speed at which a user pulls the line when disentangling the line and, for example, it is set to 10 cm per second. This value varies with the diameter of the line wound on a spool.

Upon completion of the judgement, the process returns to (S1). If the process is in (S2) after it is judged that backlash has occurred, the process moves on to (S4). When the spool is wound in the winding direction at a speed faster than the predetermined value ω2 (−50 in this embodiment), it is judged that a user has fixed the backlash. Once it is judged that the backlash has occurred, it is considered to continue until the occurrence of a winding speed in absolute value larger than the ω2, and the judgement remains NO.

Next, when it is judged in (S4) that the backlash has been fixed, the process moves on to (S3) again the next time and thereafter, and the next backlash fixing operation is detected. When the above detection method detects the occurrence of line entanglement, the casting skill is devaluated. The casting skill is highly evaluated when repeatedly casting without causing line entanglement.

Next, a method of measuring the time required to retrieve a rig and cast out the rig again will be described. Here, the time required to retrieve a rig and cast out the rig again is defined as a time interval from (6) to the next (1) among the above-mentioned fishing operations (1) to (6). Generally, the shorter the time required to retrieve a rig and cast out the rig again is, the better the catch will be. Since fish may be caught between (3) and (5) above, the larger the ratio of time between (3) and (5) to the total time of fishing is, the better the catch will be. Since besides (3) to (5), the most time consuming is the section between (6) and (1), the likelihood of catching fish becomes higher when the operations to be performed during this section are promptly handed. Skilled persons require less time for the section from (6) to (1) and tend to catch more fish.

In the double-bearing fishing reel 10A, (1) is recognized when the unwindable state detector 194 detects that the clutch is switched from on to off. Thereafter, (2) is recognized when the spool rotation detector 192 detects that the spool 11A starts rotating. Then, (3) is recognized when the unwindable state detector 194 detects that the clutch is switched from off to on. When the phenomena in (1) to (3) occur continuously, a fishing line is recognized to have been reeled out. That point of time of each said phenomena is recorded.

A method of detecting the completion of retrieval of a rig by a retrieval completion detector 162 will be described. In most instances, users do not perform winding operations during the period from completion of collection of a fishing line in (6) to the next reeling out in (3). Therefore, when it is detected that the reeling out of the fishing line has started, the time of the immediately preceding last winding operation is the time of completion of collection. Recording this time makes it possible to detect retrieval of the rig.

The time required to retrieve a rig and cast out the rig again is obtained by calculating the difference in time between completion of retrieval of the rig and the start of the next reeling out. The casting skill is rated high when the time required to retrieve a rig and cast out the rig again that is measured by the detection method described above is shorter than a predetermined value, and is rated low when it is longer than the predetermined value.

The three evaluation methods described above are only examples of casting skill evaluation methods. There are also other elements that constitute the casting skill, some of which can be calculated by detecting operations on the tackle. They may be calculated by a method using machine learning. That is, a large number of operation data of highly skilled users and inexperienced users are prepared as teacher data. The casting skill may also be calculated by judging the teacher data by an evaluation method using a neural network or data mining.

Next, a method of calculating the reeling skill will be described. Methods of making a fish bite a hook vary with the target fish and fishing method. Among them are methods and situations in which the change in the speed of pulling a lure is small and the catch increases when the lure can be moved at a constant speed. However, because of the difference in operability according to the handle angle when rotating the handle by hand, it is not easy to rotate the handle at a constant speed, and persons with higher skills can rotate the handle at a more constant speed. In such a fishing method, if a change in the rotation speed of the handle is detected, the smaller the speed change is, the more highly the reeling skill can be rated.

The speed of rotating the handle can be detected by the winding operation detector 193. The difference between the maximum value and minimum value of the values monitored for a certain period of time is the change in speed of rotating the handle during said period. It is better to exclude when the handle is not moving from the evaluation target since the change in speed is also zero.

The evaluation method described above is only an example of reeling skill evaluation methods. Further, there are many other elements that constitute the reeling skill depending on the target fish or fishing method, some of which can be calculated by detecting operations on the tackle. They may be calculated by a method using machine learning. That is, a large number of operation data of highly skilled users and inexperienced users are prepared as teacher data. The reeling skills may also be calculated by judging the teacher data by an evaluation method using machine learning such as a neural network.

Next, a method of calculating fighting skill will be described. As this value is obtained by evaluating the moment when a fish bites at the rig 30, it is necessary to first detect this moment. For example, a fish bite can be detected when the tension for the fishing line detected by the tension detector 191 becomes a predetermined value or more, when deflection of the fishing rod detected by the deflection detector 211 becomes a predetermined value or more, or when the fishing rod vibrates at a specific frequency. One criterion for evaluating fighting skills is the change in tension from a bite by a fish to landing the fish. When the tension of the fishing line suddenly weakens, the fishing line easily slacks, which increases the risk of fish coming off the hook. When such a state is detected, the fighting skill is rated low. Further, if the tension acting on the fishing line rises to near the breaking tension due to inappropriate setting of a drag device, inappropriate operation of a rod or the like, the risk of breakage of the fishing line increases. When such a state is detected, the fighting skill is rated low.

If the length of the unwound fishing line becomes nearly zero with the tension of the fishing line maintained or with deflection of the fishing rod kept at a predetermined value or more, it can be judged that the fish has been successfully landed. Hence, the fighting skill is rated high. Further, the shorter the time required to catch and collect a fish is, the more highly the fighting skill may be rated.

In this manner, the fighting skill can be evaluated by calculating the detection results of the detectors 19 and 21. A machine learning method such as a neural network is effective because judgement by a combination of multiple detection results works well.

In the above example, the overall skill of handling fishing tools is divided into three categories: the casting skill, the reeling skill and the fighting skill. The overall skill may be obtained by calculating a weighted average of these three skills. Since this makes it possible to indicate the skill with a single index, it will be more easily handled when plotted on a chart or the like.

The importance of each skill varies with the target fish and fishing method. For example, in surf-fishing for sillaginoid, the casting skill is important because it is often more advantageous to cast farther, but the fighting skill is less important because the swimming power of the target fish is weak. On the other hand, when going for a big fish in boat fishing deep at sea, the casting skill is less important because a rig is often just dropped on the sea floor, but the fighting skill is important because the swimming power of the target fish is strong. Therefore, the weights determined for each item may be changed when calculating a weighted average depending on the target fish or fishing method.

Further, the skill of handling fishing tools generally improves with greater experience. Therefore, the skill can be more highly rated with increase in the hours of handling the fishing tools and the frequency in reeling out a fishing line. That is, the skill value is increased every time the hours of use of the reel 10 and the fishing rod 20 exceed a predetermined time, monitoring the used hours. Alternatively, the skill value is increased every time the number of casting of a rig exceeds a predetermined value, monitoring the unwindable state detector 194, the spool rotation detector 192, and the winding operation detector 193 to count the number of castings of the rig. This value may be added to each element of the casting skill, the reeling skill, and the fighting skill according to the state and method of use of the tackle, or may be counted, separately defining skills of experience, as the value thereof.

The skill value calculated by the above method is stored in the storage 18 and displayed on an indicator 34 as necessary. FIGS. 7 to 11(b) show examples indicating skill values.

Figure 7:
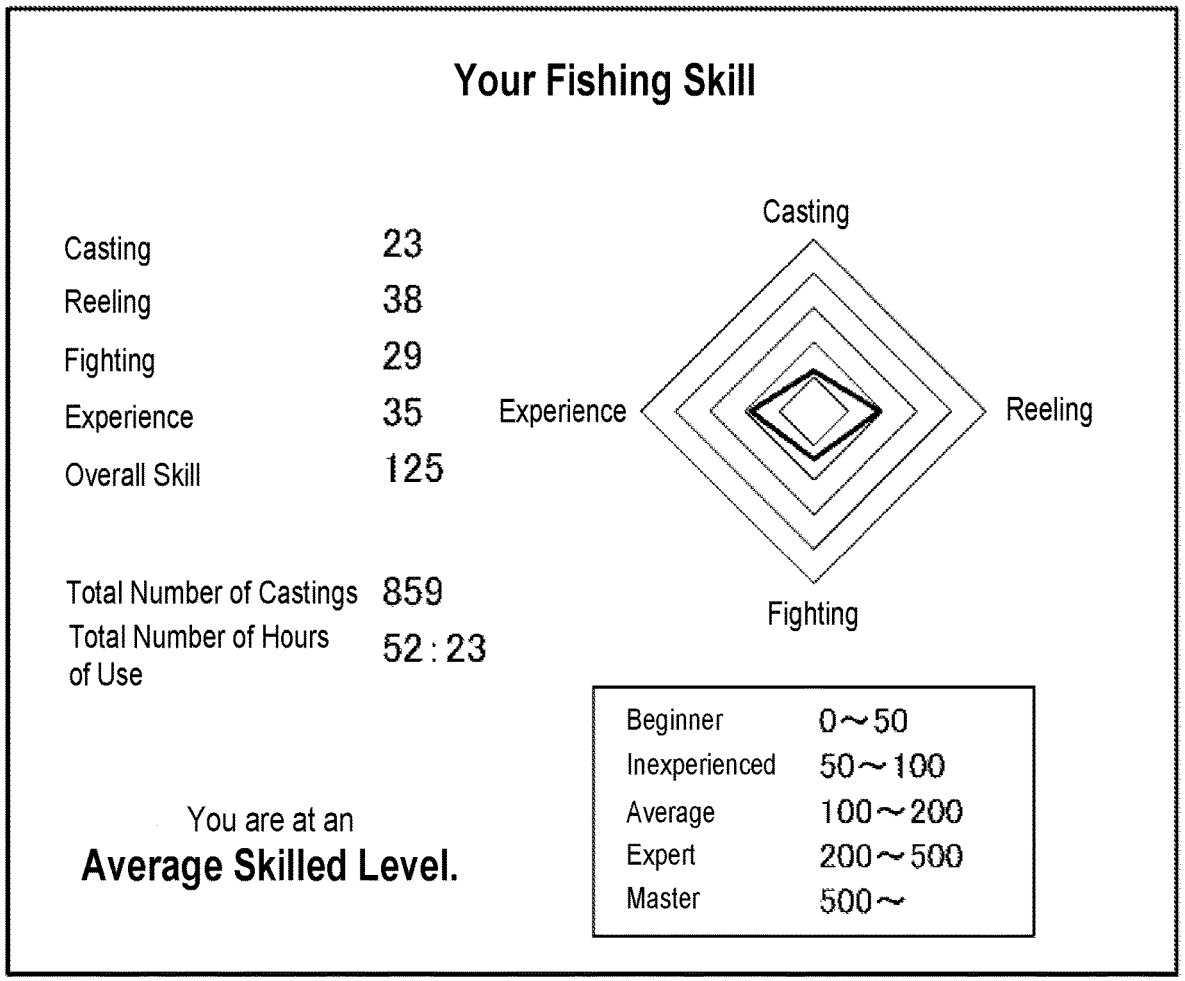
FIG. 7 is a diagram illustrating an example of a skill value in a fishing information management system according to an example.

First, in FIG. 7, the items constituting the skill of handling fishing tools (overall skill, which is the sum of the elements described herein) are indicated. This helps a user understand his or her own skill. At this time, a visual presentation is preferable as shown in FIG. 7, which includes plotting each item on a chart. Further, in this example, rankings are displayed in accordance with the overall skill. By doing so, it is possible to improve users' motivation.

Figures 8, 9:
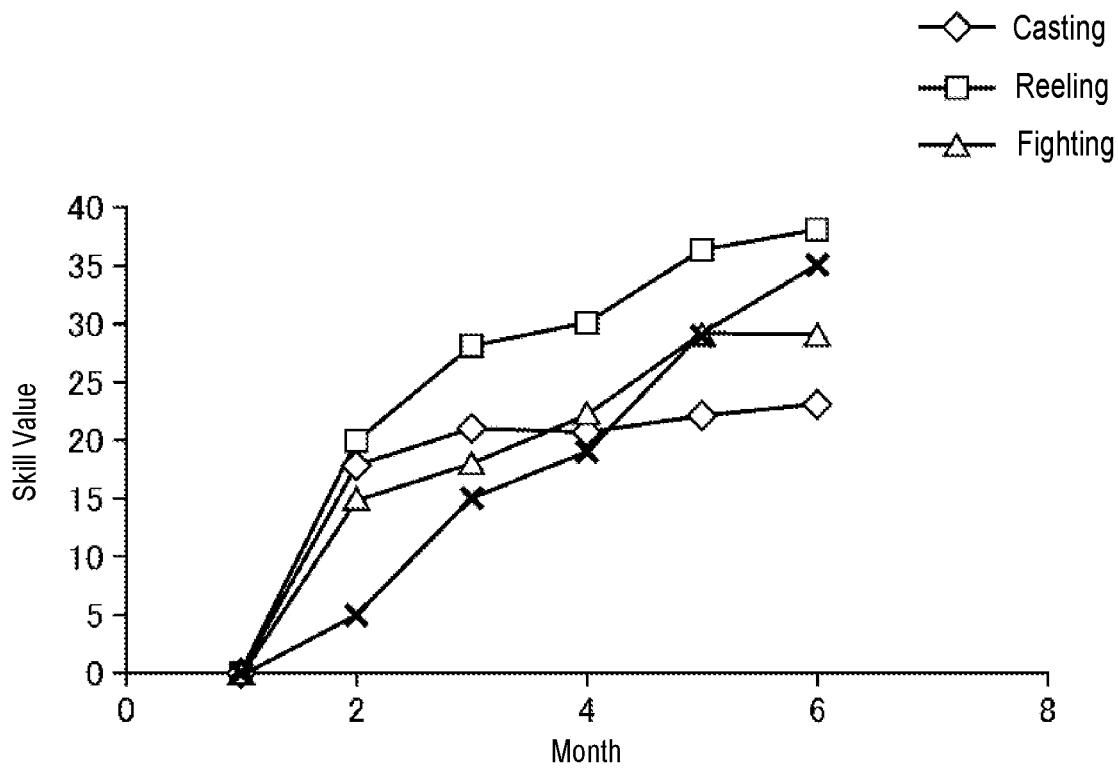
FIG. 8 is a diagram illustrating an example of a skill value in a fishing information management system according to an example.
FIG. 9 is a diagram illustrating an example of a skill value in a fishing information management system according to an example.

Next, FIG. 8 shows an example indicating the catches and the skill values of users who participated in a fishing competition. In this manner, the skills of multiple users displayed and compared may be used as a ranking criterion.

Further, FIG. 9 shows the time change in each skill value for each month. On the other hand, FIG. 10 shows a display example based on the amount of change in the skill value for a day. In this manner, displaying time changes and commendations can give users a realization of an improvement in their skills of handling fishing tools, which makes it possible to improve users' motivation.

Figure 11A:
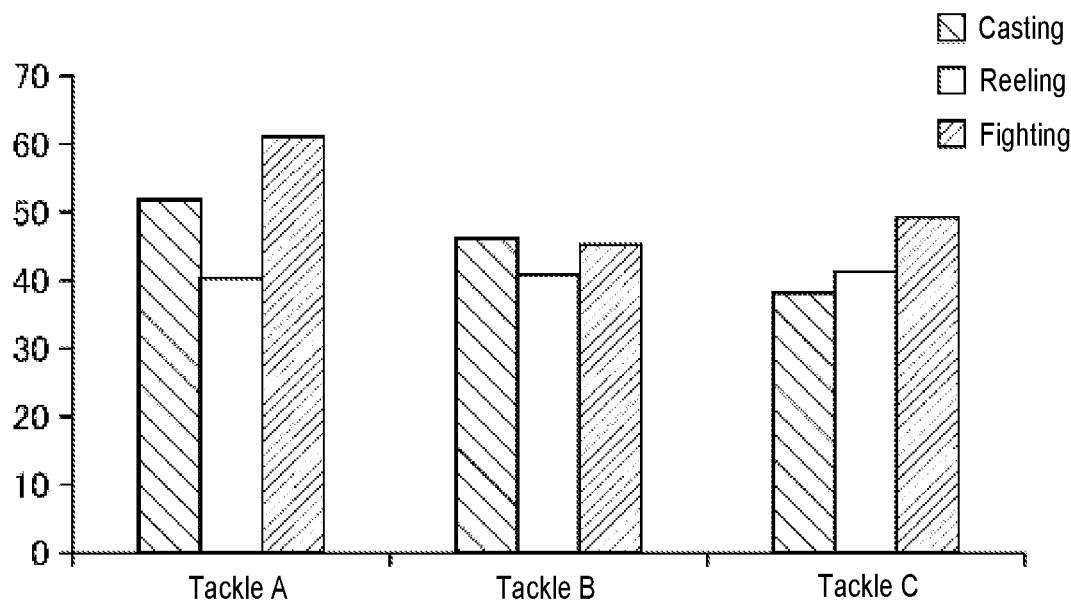
FIGS. 11(a) and (b) are diagrams illustrating an example of a skill value in a fishing information management system according to an example.
Figure 11B:
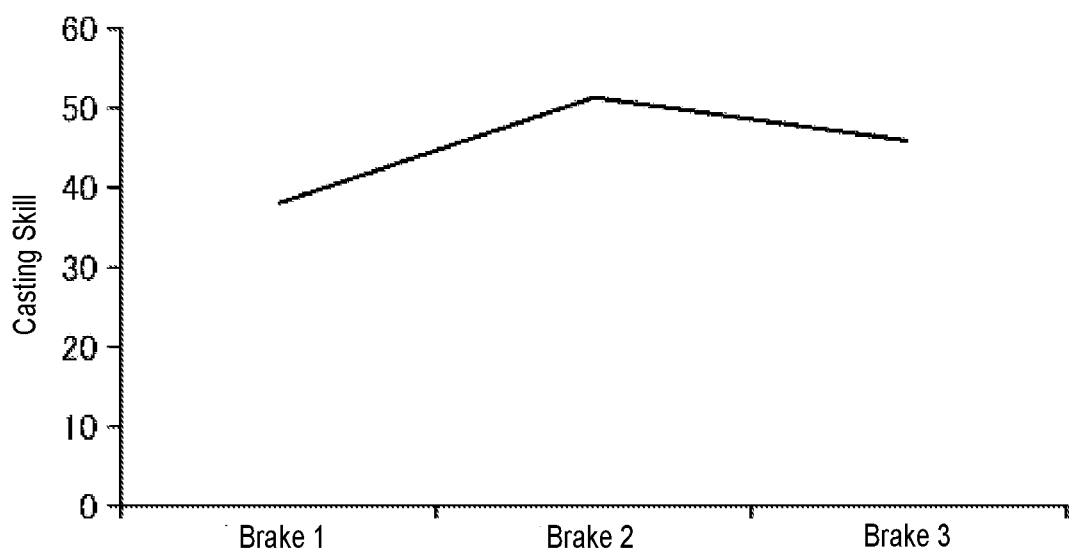

Further, FIG. 11(a) shows skill values for each type of tackle. Further, FIG. 11(b) shows casting skills value corresponding to the braking force of the braking device 15. The horizontal axis represents the types of operations that can be performed by a user, or tackles, and the vertical axis represents skill values that can be used as a criterion to judge which tackle should be used, or can be used to optimize the set value of the tackle. For example, in the example in FIG. 11(b), using the braking force of the brake 2 is found to be most advantageous upon casting.

Next, an example of my fishing information management system 100 will be described. The fishing information management system 100 is configured to include the fishing reel 1, the fishing rod 21, and the fishing information processor 10.

More specifically, the fishing information management system 100 has the fishing rod 21 to which the fishing reel 1 with a spool 3 capable of winding a fishing line is attached, and is configured to include the operation/environment information detector 22 that detects information on the operation of the fishing tools and the operation environment when the fishing tools including the fishing reel 1 and the fishing rod 21 are used, the calculator 32 that calculates the skill levels in operating fishing tools from information on the operation of the fishing tools, a storage 33 that stores the detection values and the skill levels, and the indicator 34 that displays at least either of the detection values or the skill levels.

The fishing information management system 100 makes it possible to provide a fishing information management system including a fishing rod to which a fishing reel with a spool capable of winding a fishing line is attached, and that can calculate fishing skill levels from various fishing information.

The fishing tools may be configured to include at least the fishing reel, the fishing rod, the fishing line, a hook, and a rig.

The operation environment of the fishing tools may be configured to include at least the start time and the end time for the use of the fishing tools, a weather condition when the fishing tools are used, and a location where the fishing tools are used.

The operation/environment information detector 22 may be configured to include at least a reel operation information detector 23 that detects the operation information of the fishing reel 1, and a fishing rod operation information detector 24 that detects the operation information of the fishing rod 21.

The operation information of the fishing reel 1 may be configured to include at least one of a pulled-out amount or a pulling-out speed of a reel's drag, a spool rotation start point, a spool rotation end point, a spool diameter, a maximum rotation speed of a spool, a rotation speed history of the spool, a brake setting, a motion of a fishing rod, and backlash information.

The operation information of the fishing rod 21 may be configured to include at least one of a speed, an acceleration, a deformation amount, and a motion of, and a method of casting, a fishing rod.

The skill levels in operating the fishing tools may be configured to be calculated from at least one of the flying distance of a reel, the maximum rotation speed of the reel, and the time required to retrieve a rig and cast out the rig again. In this manner, fishing skill levels can be calculated based on an appropriate detection value.

The dimensions, materials and arrangements of each component described herein are not limited to those explicitly described in the examples, and each component can be modified to have any dimension, material and arrangement that can be included within the scope of this disclosure. Further, components that are not explicitly described herein may be added to the described examples, or some of the components described in each example may also be omitted.

What is claimed is:

1. A fishing information management system having fishing tools including a fishing rod to which a fishing reel with a spool capable of winding a fishing line is attached, comprising:
    an operation/environment information detector configured to detect operation information on operation and operation environment of the fishing tools when in use including the fishing reel and the fishing rod, wherein the detected operation information comprises (i) a rotation speed of the spool and (ii) backlash information that is determined based on the rotation speed of the spool;
    a calculator configured to calculate skill levels in operating the fishing tools based on the backlash information;
    a storage configured to store the operation information and the skill levels; and
    an indicator configured to display at least either of the operation information or the skill levels,
    wherein the operation/environment information detector is configured to:
        determine a number of times that the rotation speed of the spool exceeds a predetermined threshold rotation speed value within a predetermined period of time, the number of times being a plurality of times;
        determine whether the number of times is greater than a predetermined threshold value of the number of times that the rotation speed of the spool exceeds the predetermined threshold rotation speed value within the predetermined period of time; and
        in response to determining that the number of times is greater than the predetermined threshold value, determine that a backlash has occurred.

2. The fishing information management system according to claim 1, wherein the fishing tools include at least the fishing reel, the fishing rod, the fishing line, a hook, and a rig.

3. The fishing information management system according to claim 1, wherein the operation environment of the fishing tools includes at least a start time and an end time for use of the fishing tools, a weather condition when the fishing tools are used, and a location where the fishing tools are used.

4. The fishing information management system according to claim 1, wherein the operation/environment information detector includes at least a reel operation information detector that detects operation information of the fishing reel, and a fishing rod operation information detector that detects operation information of the fishing rod.

5. The fishing information management system according to claim 1, wherein the operation information of the fishing reel includes at least one of a pulled-out amount of the fishing reel's drag, a pulling-out speed of the fishing reel's drag, a spool rotation start point, a spool rotation end point, a spool diameter, a maximum rotation speed of a spool, a rotation speed history of the spool, a brake setting, and a motion of a fishing rod.

6. The fishing information management system according to claim 1, wherein the operation information of the fishing rod includes at least one of speed, acceleration, deformation amount, and motion of and method of casting the fishing rod.

7. The fishing information management system according to claim 2, wherein the skill levels in operating the fishing tools are calculated from at least one of a flying distance of a casted fishing line or a maximum rotation speed of the fishing reel, or a time required to retrieve the rig and cast out the rig again.

* * * * *